(12) United States Patent
Breuer et al.

(10) Patent No.: US 9,564,966 B1
(45) Date of Patent: Feb. 7, 2017

(54) RECONSTRUCTING LIGHT-BASED COMMUNICATION SIGNALS USING AN ALIAS FREQUENCY

(71) Applicants: Christian Breuer, Newburyport, MA (US); Anant Aggarwal, Waltham, MA (US); Barry Stout, Beverly, MA (US)

(72) Inventors: Christian Breuer, Newburyport, MA (US); Anant Aggarwal, Waltham, MA (US); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/870,445

(22) Filed: Sep. 30, 2015

(51) Int. Cl.
*H04B 10/00* (2013.01)
*H04B 10/079* (2013.01)
*H04W 4/02* (2009.01)
*G01J 1/42* (2006.01)

(52) U.S. Cl.
CPC ............. *H04B 10/0795* (2013.01); *G01J 1/42* (2013.01); *H04W 4/023* (2013.01)

(58) Field of Classification Search
CPC ........ H04B 10/0795; G01J 1/42; H04W 4/023
See application file for complete search history.

(56) References Cited

U.S. PATENT DOCUMENTS

| | | | | |
|---|---|---|---|---|
| 2003/0094938 | A1* | 5/2003 | Yanagisawa | G01N 21/95684 324/96 |
| 2010/0098413 | A1* | 4/2010 | Li | H04B 10/0795 398/38 |
| 2011/0228830 | A1* | 9/2011 | Bouzegzi | H04L 27/0012 375/224 |
| 2014/0341565 | A1* | 11/2014 | Jolly | H04B 10/0795 398/25 |
| 2015/0215057 | A1* | 7/2015 | Knowles | H04W 64/00 455/3.05 |
| 2015/0241272 | A1* | 8/2015 | Lian | G01J 1/42 250/206 |
| 2015/0295643 | A1* | 10/2015 | Zhao | H04B 10/0795 398/29 |

* cited by examiner

*Primary Examiner* — Danny Leung
(74) *Attorney, Agent, or Firm* — Yutian Ling

(57) ABSTRACT

Methods and systems are described for sampling an LCOM message signal at a rate less than the Nyquist rate (i.e., an "alias frequency") and accurately reconstructing the entire LCOM message using a light receiver (e.g., digital camera) of a typical mobile computing device, such as a smartphone, tablet, or other mobile computing device. The described methods and system take advantage of the repetition of LCOM signals, sampling an LCOM signal at a frequency less than the Nyquist frequency over at least two repetitions of a signal waveform, thereby collecting sufficient samples to accurately reconstruct the signal. The samples of each successive signal waveform repetition are offset from one another so that different points on the waveform are sampled, thus facilitating reconstruction of the signal.

18 Claims, 13 Drawing Sheets

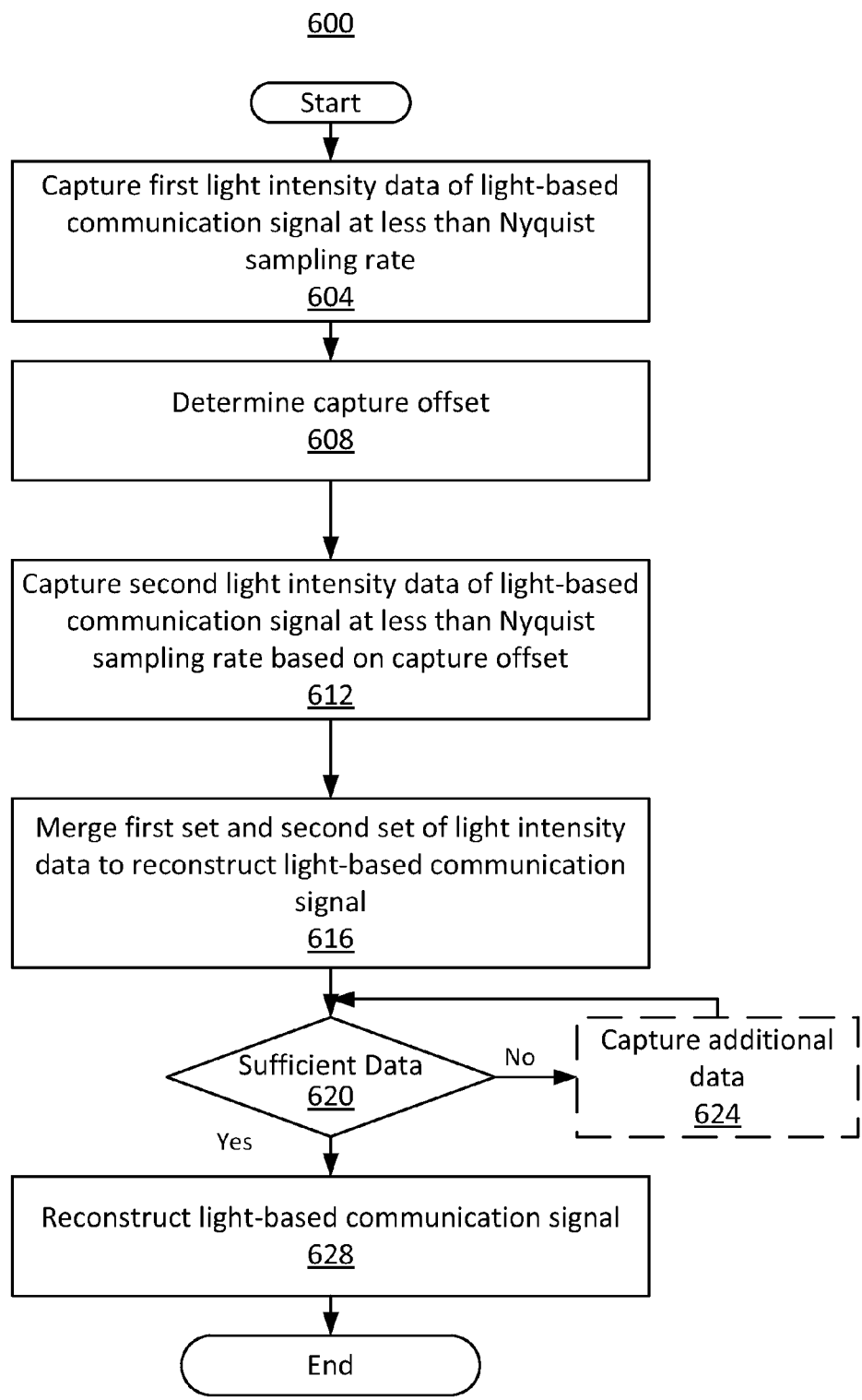

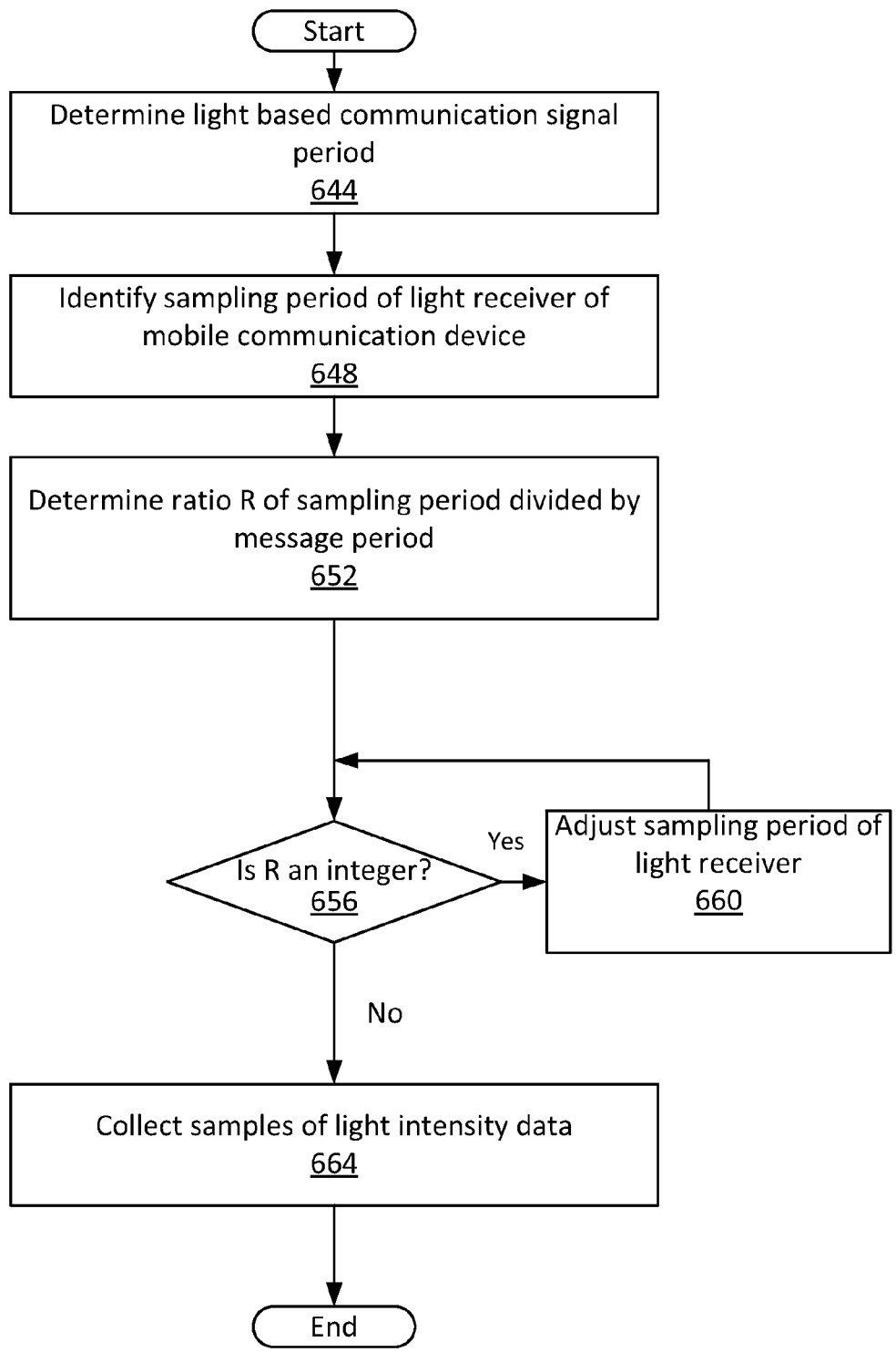

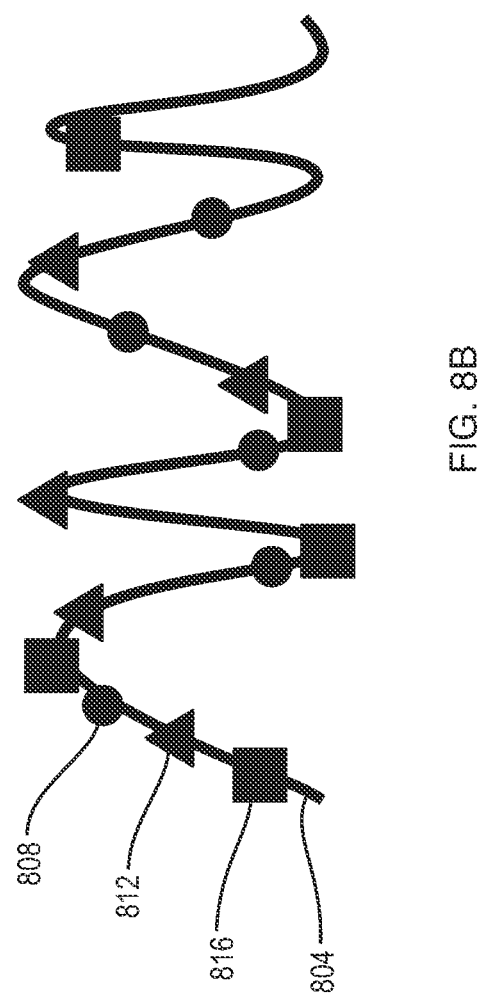

RECONSTRUCTING LIGHT-BASED COMMUNICATION SIGNALS USING AN ALIAS FREQUENCY

TECHNICAL FIELD

The present disclosure relates generally to receiving and transmitting communications signals using solid-state lighting (SSL). Specifically, the present disclosure relates to decoding signals from solid-state lights using an alias frequency.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access. GPS and Wi-Fi systems, alone or in combination, can be used to provide navigational instructions to a user in possession of a receiver configured for decoding one or more of these types of signals.

However, GPS and Wi-Fi signals are not adequate in all situations. In some cases, GPS and Wi-Fi signals are not precise or accurate enough. In other cases, a user may be in a location where the signals are absent. For example, the concrete and metal structure of a parking garage may attenuate GPS and Wi-Fi signals, leaving the receiver of the user without processable location or navigational signals. In these cases, an alternative or supplemental technology would be helpful for providing location and navigational information to a user.

BRIEF DESCRIPTION OF THE DRAWINGS

Figure (FIG. 1 is a block diagram illustrating an example light-based communication (LCOM) network, in an embodiment.

FIG. 6A is a method flow diagram illustrating a method for sampling a light-based communication signal at a rate less than a Nyquist sampling rate and reconstructing the signal, in an embodiment.

FIG. 6B is a method flow diagram illustrating a method for determining a data capture offset, in an embodiment.

FIG. 8B schematically illustrates a reconstructed LCOM waveform using light sensor data, in an embodiment FIG. 9A schematically illustrates rolling shutter image data captured over multiple repetitions of an LCOM signal used to reconstruct an LCOM waveform, in an embodiment.

Figure 1:
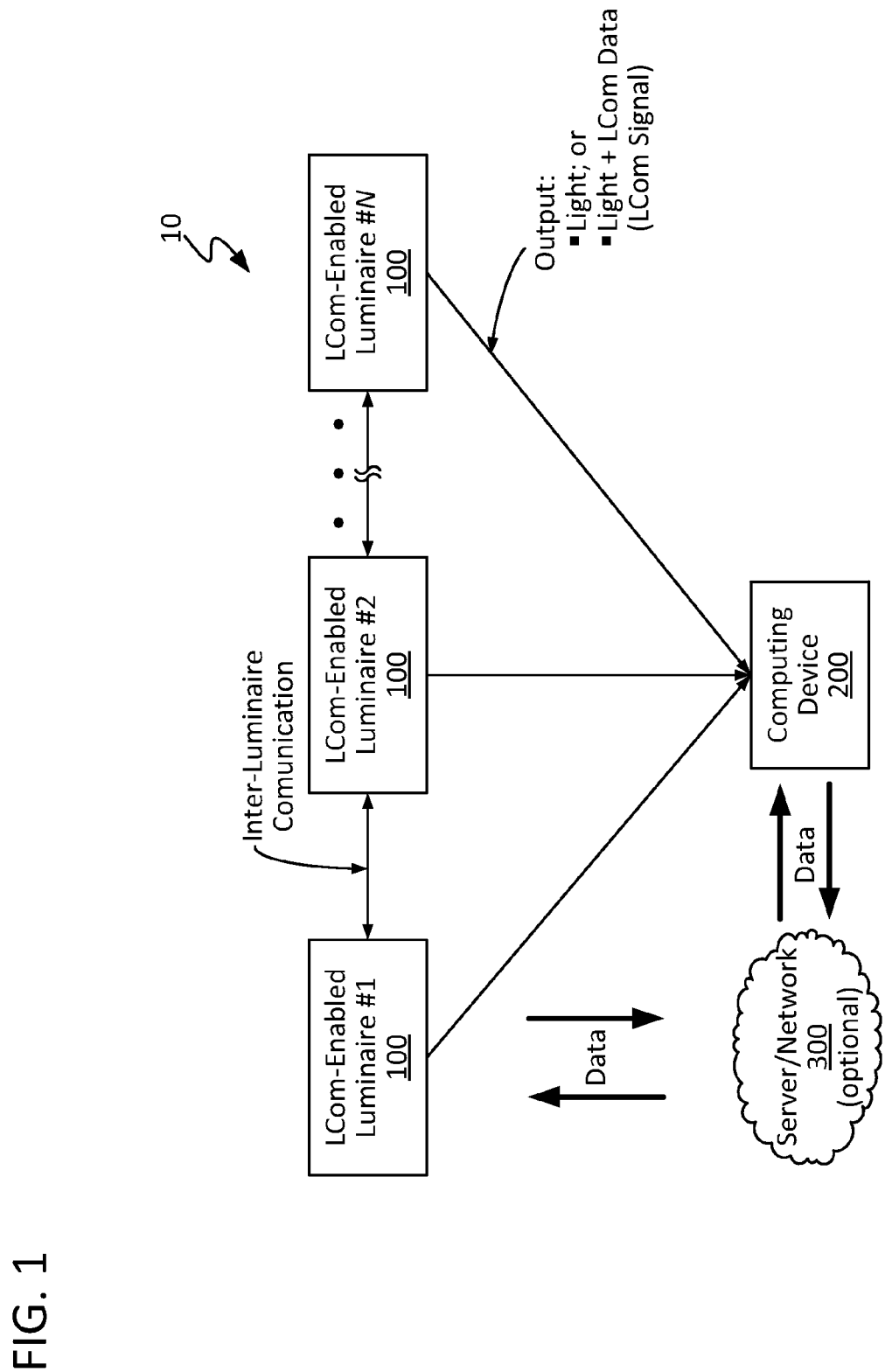

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Light-based communications ("LCOM") systems are used for providing navigation and positioning information to a user. The LCOM signals are decoded by a user device, such as a still-image camera, video camera, and/or light sensor (referred to herein collectively as a "light receiver" for convenience) of a mobile computing device. However, typical light receivers of a mobile computing device sample signals at a slower rate than the frequency of LCOM signals. For example, a typical camera on a mobile computing device such as a smartphone can capture about 10 unique samples per second using a "rolling shutter" and about 120 samples per second using a "global shutter." A light sensor on a mobile computing device samples light intensity data at about 300 samples per second. However, these example sampling rates may be inadequate for collecting sufficient data to accurately reconstruct an LCOM signal.

Accurate signal reconstruction requires sampling the transmitted signal at twice the signal frequency, or equivalently sampling at a period half the wave period of the message signal. These sampling criteria are known as the "Nyquist rate" and "Nyquist period," respectively. When these criteria are applied to LCOM signals, which often have a transmission frequency of about 200 Hz to 300 Hz (i.e., beyond the range of a human eye to see variations in the light intensity), the minimum sampling criterion is 600 samples per second or equivalently a sampling period of 3.3 milliseconds. Thus, the Nyquist rate is far higher than the sampling rates of typical light receivers of mobile computing devices. This presents a technical challenge when using a light receiver of a mobile computing device for receiving an LCOM signal and decoding the LCOM signal accurately so that the message encoded in the signal is provided to the user.

To overcome this technical challenge, the present disclosure describe methods and systems for sampling an LCOM message signal at a rate less than the Nyquist rate (i.e., at an "alias frequency") and accurately reconstructing the entire LCOM message using a light receiver of a given mobile computing device.

Prior to describing embodiments of the present disclosure, context for LCOM technology is provided in FIGS. 1-4, each of which is described as follows. As used herein, light-based communication (LCOM) generally refers to communication between an LCOM enabled solid-state luminaire and a receiver device, such as a mobile computing device having a digital camera or other sensor capable of detecting LCOM signals. The LCOM enabled luminaire emits a signal using pulsing light encoded with data. In general, the light utilized in LCOM may be of any spectral band, visible or otherwise, and may be of any intensity, as desired for a given target application or end-use. In accordance with some embodiments, in an LCOM system, a given LCOM enabled luminaire may be configured to transmit a pulsing light signal encoded with data (an LCOM signal), that is repeated a plurality of times. A receiver device, such as a mobile computing device, may be configured to detect the pulsing light signal encoded with data via one or more light-sensing devices, such as the still-image camera, the video camera, and/or the ambient light sensor mentioned above, among others. As will be appreciated, many digital camera devices available in mobile computing devices are capable of operating as both still and video cameras.

As will be appreciated in light of this disclosure, techniques disclosed herein can be utilized in any of a wide range of LCOM applications and contexts. For example, techniques disclosed herein can be utilized, in accordance with some embodiments, in transmitting location and positioning information between an LCOM enabled luminaire and a light receiver. This information may be utilized, in part or in whole, to provide for indoor navigation, in accordance with some embodiments. In some cases, techniques disclosed herein can be utilized as the basis for a positioning and navigation system that may realize improvements in positioning precision and accuracy, for example, over existing GPS-based and WPS-based systems. As such, it follows that techniques disclosed herein can be utilized, in accordance with some embodiments, for commercial endeavors not possible with existing GPS-based and Wi-Fi-based approaches. More particularly, while the limited accuracy of existing GPS-based and Wi-Fi-based approaches is not sufficient for directing a customer to an item of interest on a shelf within a retail store, techniques disclosed herein can be utilized, in accordance with some embodiments, to lead customers directly to in-store promotions and other on-shelf items, as desired. Numerous configurations and variations will be apparent in light of this disclosure.

LCOM System Architecture

FIG. 1 is a block diagram illustrating an example light-based communication (LCOM) system 10 configured in accordance with an embodiment of the present disclosure. As can be seen, system 10 may include one or more LCOM enabled luminaires 100 configured for light-based communicative coupling with a receiver computing device 200 via LCOM signal(s). As described herein, LCOM signals are provided, in accordance with some embodiments, via visible light-based signals. In some cases, LCOM may be provided in only one direction; for instance, LCOM data may be passed from a given LCOM enabled luminaire 100 (e.g., the transmitter) to a computing device 200 (e.g., the receiver), or from a computing device 200 (e.g., the transmitter) to a given LCOM enabled luminaire 100 (e.g., the receiver). In some other cases, LCOM may be provided in both or multiple directions; for instance, LCOM data may be passed between a given LCOM enabled luminaire 100 and a computing device 200, where both act in a transmitting and receiving (e.g., transceiver) capacity. In some cases in which system 10 includes a plurality of LCOM enabled luminaires 100, all (or some sub-set) of thereof may be configured for communicative coupling with one another (e.g., inter-luminaire communication). In accordance with some embodiments, system 10 optionally may include or otherwise be configured for communicative coupling, for example, with a server/network 300 (discussed below). Communicative coupling may be provided, for example, between server/network 300 and computing device 200 and/or one or more LCOM enabled luminaires 100, as desired.

Figure 2A:
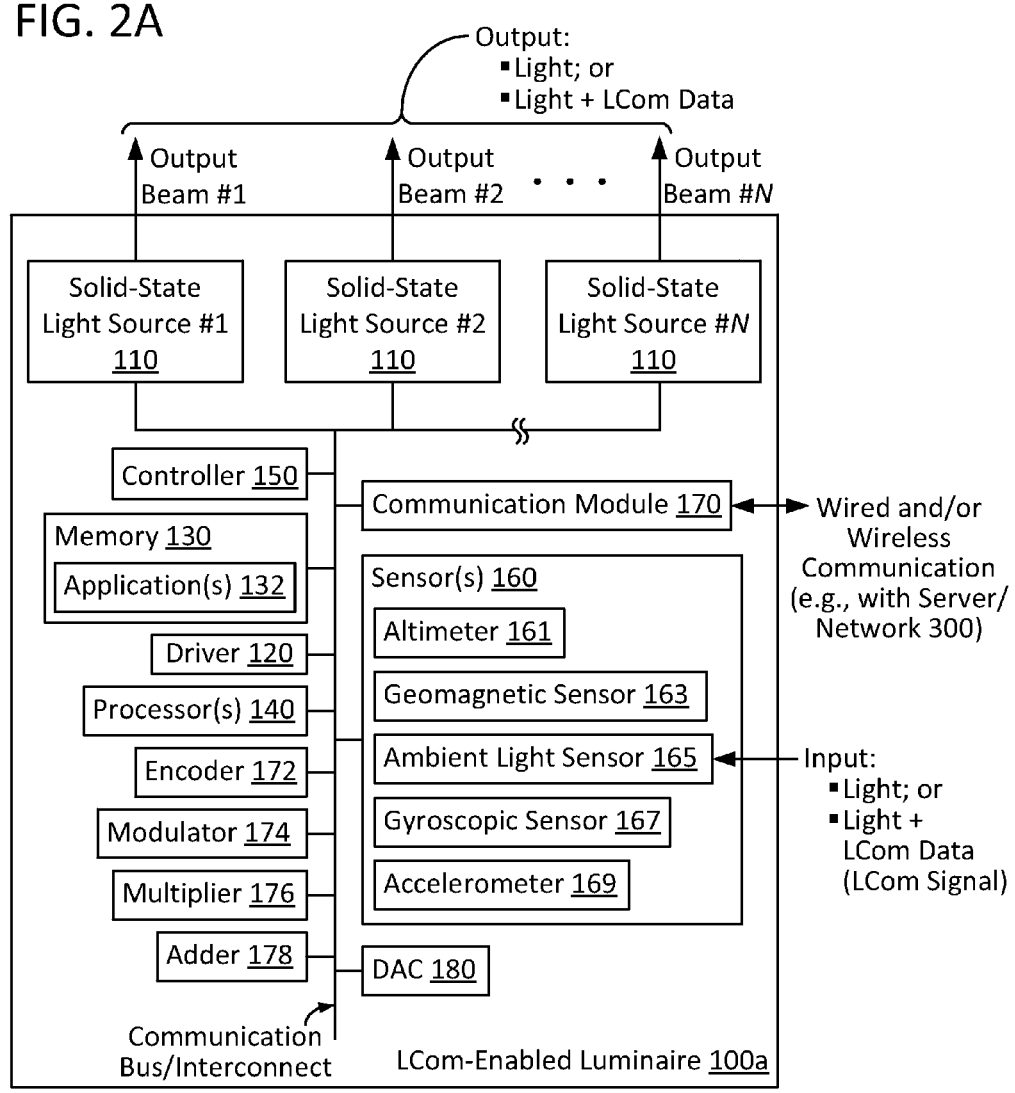
FIG. 2A is a block diagram illustrating an LCOM enabled luminaire, in an embodiment.
Figure 2B:
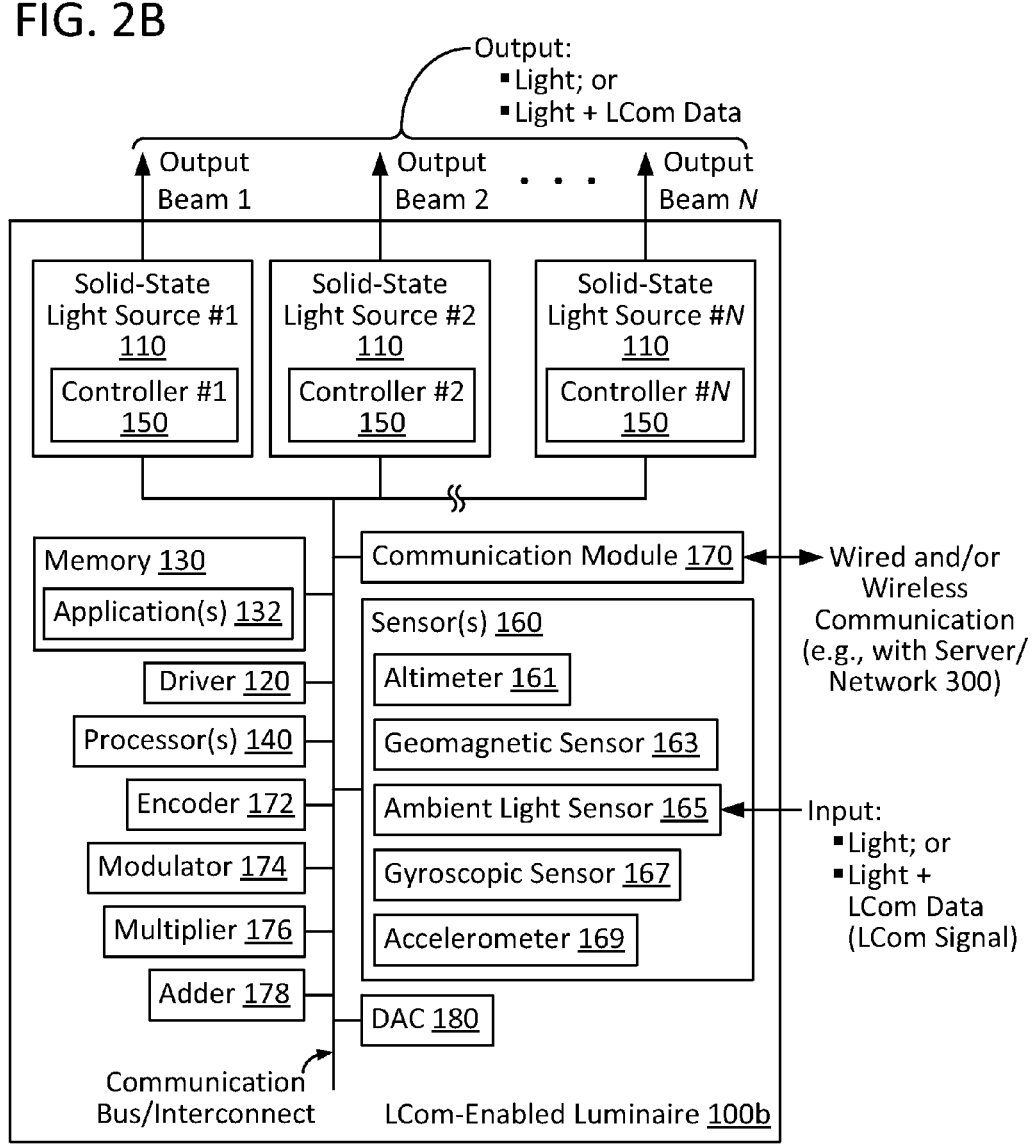
FIG. 2B is a block diagram illustrating an LCOM enabled luminaire, in an embodiment.

FIG. 2A is a block diagram illustrating an LCOM enabled luminaire 100a configured in accordance with an embodiment of the present disclosure. FIG. 2B is a block diagram illustrating an LCOM enabled luminaire 100b configured in accordance with another embodiment of the present disclosure. For consistency and ease of understanding of the present disclosure, LCOM enabled luminaires 100a and 100b hereinafter may be collectively referred to generally as an LCOM enabled luminaire 100, except where separately referenced.

As can be seen, a given LCOM enabled luminaire 100 may include one or more solid-state light sources 110, in accordance with some embodiments. The quantity, density, and arrangement of solid-state light sources 110 utilized in a given LCOM enabled luminaire 100 may be customized, as desired for a given target application or end-use. A given solid-state light source 110 may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. A given solid-state emitter may be configured to emit electromagnetic radiation (e.g., light), for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness semiconductor light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate, as will be apparent in light of this disclosure. In some cases, power and/or control connections for a given solid-state emitter may be routed from a given PCB to a driver 120 (discussed below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted therethrough. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCOM enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCOM enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be seen from FIGS. 2A-2B, a given LCOM enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCOM enabled luminaire 100 and one or more of the modules thereof (e.g., within memory 130 or elsewhere). In some cases, memory 130 may be configured to be utilized, for example, for processor workspace (e.g., for one or more processors 140) and/or to store media, programs, applications, and/or content on a host LCOM enabled luminaire 100 on a temporary or permanent basis.

The one or more modules stored in memory 130 can be accessed and executed, for example, by the one or more processors 140 of a given LCOM enabled luminaire 100. In accordance with some embodiments, a given module of memory 130 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 130 can be encoded, for example, on a machine-readable medium that, when executed by a processor 140, carries out the functionality of a given LCOM enabled luminaire 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 130 (e.g., one or more applications 132, discussed below) can be implemented in hardware, software, and/or firmware, as desired for a given target application or end-use.

In accordance with some embodiments, memory 130 may have stored therein (or otherwise have access to) one or more applications 132. In some instances, a given LCOM enabled luminaire 100 may be configured to receive input, for example, via one or more applications 132 stored in memory 130 (e.g., such as a lighting pattern, LCOM data, etc.). Other suitable modules, applications, and data which may be stored in memory 130 (or may be otherwise accessible to a given LCOM enabled luminaire 100) will depend on a given application and will be apparent in light of this disclosure.

In accordance with some embodiments, the one or more solid-state light sources 110 of a given LCOM enabled luminaire 100 can be electronically controlled, for example, to output light and/or light encoded with LCOM data (e.g., an LCOM signal). To that end, a given LCOM enabled luminaire 100 may include or otherwise be communicatively coupled with one or more controllers 150, in accordance with some embodiments. In some embodiments, such as that illustrated in FIG. 2A, a controller 150 may be hosted by a given LCOM enabled luminaire 100 and operatively coupled (e.g., via a communication bus/interconnect) with the one or more solid-state light sources 110 (1–N) of that LCOM enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface, optional server/network 300, etc.). As a result, a given LCOM enabled luminaire 100 may be controlled in such a manner as to output any number of output beams (1–N), which may include light and/or LCOM data (e.g., an LCOM signal), as desired for a given target application or end-use.

However, the present disclosure is not so limited. For example, in some other embodiments, such as that illustrated in FIG. 2B, a controller 150 may be hosted, in part or in whole, by a given solid-state light source 110 of a given LCOM enabled luminaire 100 and operatively coupled (e.g., via a communication bus/interconnect) with the one or more solid-state light sources 110. If LCOM enabled luminaire 100 includes a plurality of such solid-state light sources 110 hosting their own controllers 150, then each such controller 150 may be considered, in a sense, a mini-controller, providing LCOM enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCOM enabled luminaire 100 and may do so, for example, based on wired and/or wireless input received from a given local source (e.g., such as on-board memory 130) and/or remote source (e.g., such as a control interface, optional server/network 300, etc.). As a result, LCOM enabled luminaire 110 may be controlled in such a manner as to output any number of output beams (1–N), which may include light and/or LCOM data (e.g., an LCOM signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCOM data for transmission by a given LCOM enabled luminaire 100. In some embodiments, controller 150 may be configured to output a control signal to modulator 174 (discussed below) to facilitate modulation of an LCOM signal for transmission by a given LCOM enabled luminaire 100. Other suitable configurations and control signal output for a given controller 150 of a given LCOM enabled luminaire 100 will depend on a given application and will be apparent in light of this disclosure.

In accordance with some embodiments, a given LCOM enabled luminaire 100 may include an encoder 172. In some embodiments, encoder 172 may be configured, for example, to encode LCOM data in preparation for transmission thereof by the host LCOM enabled luminaire 100. To that end, encoder 172 may be provided with any suitable configuration, as will be apparent in light of this disclosure.

In accordance with some embodiments, a given LCOM enabled luminaire 100 may include a modulator 174. In some embodiments, modulator 174 may be configured, for example, to modulate an LCOM signal in preparation for transmission thereof by the host LCOM enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCOM enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing therethrough, as desired. Other suitable configurations for multiplier 176 will depend on a given application and will be apparent in light of this disclosure.

In accordance with some embodiments, a given LCOM enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing therethrough, as desired. Other suitable configurations for adder 178 will depend on a given application and will be apparent in light of this disclosure.

In accordance with some embodiments, a given LCOM enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCOM enabled luminaire 100 to output an LCOM signal therefrom. Other suitable configurations for DAC 180 will depend on a given application and will be apparent in light of this disclosure.

Figure 3:
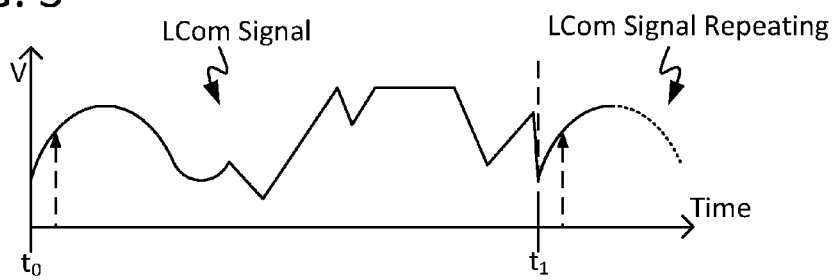
FIG. 3 illustrates an example arbitrary LCOM signal as may be transmitted by an LCOM enabled luminaire, in an embodiment.

As previously noted, a given LCOM enabled luminaire 100 may be configured, in accordance with some embodiments, to output light and/or light encoded with LCOM data (e.g., an LCOM signal). FIG. 3 illustrates an example arbitrary LCOM signal as may be transmitted by an LCOM enabled luminaire 100, in accordance with an embodiment of the present disclosure. As can be seen here, LCOM enabled luminaire 100 may be configured, in accordance with some embodiments, to transmit a given LCOM signal at a given transmission rate over a given time interval ($t_1$-$t_0$). In some cases, a given LCOM enabled luminaire 100 may be configured to repeatedly output its one or more LCOM signals. In any case, the transmission rate may be customized, as desired for a given target application or end-use.

In accordance with some embodiments, a given LCOM enabled luminaire 100 may include one or more sensors 160. In some embodiments, a given LCOM enabled luminaire 100 optionally may include an altimeter 161. When included, altimeter 161 may be configured as typically done, and in some example embodiments may be configured to aid in determining the altitude of a host LCOM enabled luminaire 100 with respect to a given fixed level (e.g., a floor, a wall, the ground, or other surface). In some embodiments, a given LCOM enabled luminaire 100 optionally may include a geomagnetic sensor 163. When included, geomagnetic sensor 163 may be configured as typically done, and in some example embodiments may be configured to determine the orientation and/or movement of a host LCOM enabled luminaire 100 relative to a geomagnetic pole (e.g., geomagnetic north) or other desired heading, which may be customized as desired for a given target application or end-use. In some embodiments, a given LCOM enabled luminaire 100 optionally may include an ambient light sensor 165. When included, ambient light sensor 165 may be configured as typically done, and in some example embodiments may be configured to detect and measure ambient light levels in the surrounding environment of the host LCOM enabled luminaire 100. In some cases, ambient light sensor 165 may be configured to output a signal, for example, to a multiplier 176 of LCOM enabled luminaire 100. In some embodiments, a given LCOM enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCOM enabled luminaire 100. In some embodiments, a given LCOM enabled luminaire 100 optionally may include an accelerometer 169. When included, accelerometer 169 may be configured as typically done, and in some example embodiments may be configured to detect motion of the host LCOM enabled luminaire 100. In any case, a given sensor 160 of a given host LCOM enabled luminaire 100 may include mechanical and/or solid-state componentry, as desired for a given target application or end-use. Also, it should be noted that the present disclosure is not so limited only to these example optional sensors 160, as additional and/or different sensors 160 may be provided, as desired for a given target application or end-use, in accordance with some other embodiments. Numerous configurations will be apparent in light of this disclosure.

In accordance with some embodiments, a given LCOM enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCOM enabled luminaires 100. To that end, communication module 170 may be configured to use any suitable wired and/or wireless transmission technologies (e.g., radio frequency, or RF, transmission; infrared, or IR, light modulation; etc.), as desired for a given target application or end-use. Other suitable configurations for communication module 170 will depend on a given application and will be apparent in light of this disclosure.

Figure 4:
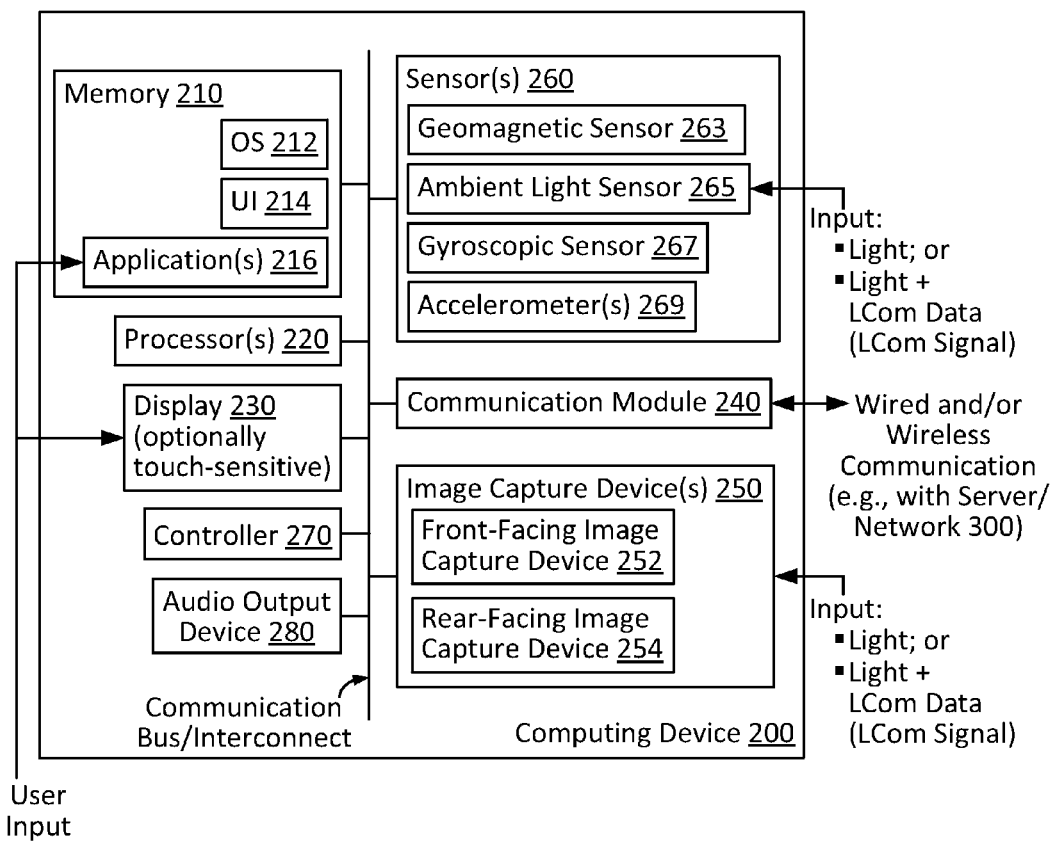
FIG. 4 illustrates an example computing device, in an embodiment.

FIG. 4 illustrates an example computing device 200 configured in accordance with an embodiment of the present disclosure. As discussed herein, computing device 200 may be configured, in accordance with some embodiments: (1) to detect the light pulses of an LCOM signal emitted by a transmitting LCOM enabled luminaire 100; and (2) to decode the LCOM data from a detected LCOM signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis.

The one or more modules stored in memory 210 can be accessed and executed, for example, by the one or more processors 220 of computing device 200. In accordance with some embodiments, a given module of memory 210 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 210 can be encoded, for example, on a machine-readable medium that, when executed by a processor 220, carries out the functionality of computing device 200, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 210 (e.g., such as OS 212, UI 214, and/or one or more applications 216, each discussed below) can be implemented in hardware, software, and/or firmware, as desired for a given target application or end-use.

In accordance with some embodiments, memory 210 may include an operating system (OS) 212. OS 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCOM data during its flow through computing device 200. Other suitable configurations and capabilities for OS 212 will depend on a given application and will be apparent in light of this disclosure.

In accordance with some embodiments, computing device 200 may include a user interface (UI) module 214. In some cases, UI 214 can be implemented in memory 210 (e.g., as generally shown in FIG. 4), whereas in some other cases, UI 214 can be implemented in a combination of locations (e.g., at memory 210 and at display 230, discussed below), thereby providing UI 214 with a given degree of functional distributedness. UI 214 may be configured, in accordance with some embodiments, to present a graphical UI (GUI) at display 230 that is configured, for example, to aid in carrying out any of the various LCOM-related techniques discussed herein. Other suitable configurations and capabilities for UI 214 will depend on a given application and will be apparent in light of this disclosure.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). Other suitable modules, applications, and data which may be stored in memory 210 (or may be otherwise accessible to computing device 200) will depend on a given application and will be apparent in light of this disclosure.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means.

In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given GUI action. In some cases, a touch-sensitive display 230 may facilitate user interaction with computing device 200 via the GUI presented by such display 230. Numerous suitable configurations for display 230 will be apparent in light of this disclosure.

In accordance with some embodiments, computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCOM enabled luminaires 100. In some cases, communication module 240 of computing device 200 and communication module 170 of a given LCOM enabled luminaire 100 may be configured to utilize the same communication protocol. In some cases, communication module 240 may be configured to communicate with a server/network 300 (discussed below). Other suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced.

A given image capture device 250 can be any device configured to capture digital images, such as a still camera (e.g., a camera configured to capture still photographs) or a video camera (e.g., a camera configured to capture moving images comprising a plurality of frames). In some cases, a given image capture device 250 may include components such as, for instance, an optics assembly, an image sensor, and/or an image/video encoder, and may be integrated, in part or in whole, with computing device 200. These components (and others, if any) of a given image capture device 250 may be implemented in any combination of hardware, software, and/or firmware, as desired for a given target application or end-use. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCOM signal output of a transmitting LCOM enabled luminaire 100. In some instances, a given image capture device 250 may be, for example, a camera like one typically found in mobile computing devices. Other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous configurations will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional server/network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250 (e.g., front-facing image capture device 252 and/or rear-facing image capture device 254). In some instances, a given controller 270 may be configured to output a control signal to control operation of one or more sensors 260. Other suitable configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Other suitable types and configurations for audio output device 280 will depend on a given application and will be apparent in light of this disclosure.

Server/network 300 can be any suitable public and/or private communications network. For instance, in some cases, server/network 300 may be a private local area network (LAN) operatively coupled to a wide area network (WAN), such as the Internet. In some cases, server/network 300 may include one or more second-generation (2G), third-generation (3G), and/or fourth-generation (4G) mobile communication technologies. In some cases, server/network 300 may include a wireless local area network (WLAN) (e.g., Wi-Fi wireless data communication technologies). In some instances, server/network 300 may include Bluetooth wireless data communication technologies. In some cases, server/network 300 may include supporting infrastructure and/or functionalities, such as a server and a service provider, but such features are not necessary to carry out communication via server/network 300. In some instances, computing device 200 may be configured for communicative coupling, for example, with a server/network 300 and one or more LCOM enabled luminaires 100. In some cases, computing device 200 may be configured to receive data from server/network 300, for example, which serves to supplement LCOM data received by computing device 200 from a given LCOM enabled luminaire 100. In some instances, computing device 200 may be configured to receive data (e.g., such as position, ID, and/or other data pertaining to a given LCOM enabled luminaire 100) from server/network 300 that facilitates indoor navigation via one or more LCOM enabled luminaires 100. In some cases, server/network 300 may include or otherwise have access to one or more lookup tables of data that may be accessed by a computing device 200 communicatively coupled therewith. Numerous configurations for server/network 300 will be apparent in light of this disclosure.

LCOM Signal Under Sampling and Signal Reconstruction

FIG. 6A is a method flow diagram of a method 600 for sampling a light-based communication signal at a rate less than a Nyquist sampling rate of the communication signal and accurately reconstructing the signal, in an embodiment. For convenience of explanation, this process is referred to as "under sampling" or alternatively as "alias sampling."

As described above, a communication signal is conventionally thought to require sampling at a frequency twice the frequency of the signal itself ("Nyquist frequency") for the signal to be accurately reconstructed and decoded. However, because LCOM signals are typically repeated, embodiments described herein sample an LCOM signal at a frequency less than the Nyquist frequency, but do so over at least two repetitions of a signal waveform. A sufficient number of samples are collected to accurately reconstruct the signal. The samples of each successive signal repetition are offset from one another so that different segments of the signal are captured, thus facilitating accurate reconstruction of the entire signal.

The method 600 begins by capturing 604 first light intensity data of an LCOM signal as transmitted by an LCOM enabled luminaire. Each datum of the first light intensity data is captured at a known location within a first repetition of an LCOM signal that is subsequently repeated. The term "location" is used for convenience only and encompasses any convenient method for identifying a capture location between a start and an end of a signal. For example, "location" can refer to an elapsed time between the start and end of the signal in which the start time is assigned an origin value. "Location" can also refer to a timestamp based on a clock accessible by the mobile computing device (and synchronized to the signal using a phase locked loop circuit ("PLL")) or transmitted in metadata by the LCOM signal. For convenience of explanation, FIGS. 7A-9B will illustrate "location" using captured datum superimposed on a schematic waveform of an LCOM signal.

As mentioned above, the capturing is, in some embodiments, performed by a mobile computing device using a light receiver that samples the LCOM signal at less than the Nyquist frequency. The LCOM signal is sampled at a frequency less than the Nyquist frequency because the light receiver is not configured to sample at rates as high as the Nyquist frequency. In other cases, in which the light receiver of the mobile computing device is capable of sampling at a rate that is at least the Nyquist frequency, a lower sampling rate is selected because it is computationally more convenient or efficient. That is, while the light receiver of the mobile computing device may be capable of sampling at a rate that is at least the Nyquist frequency, a lower sampling frequency will allow the mobile computing device to perform other operations simultaneously with the sampling, rather than devoting more computing resources to the sampling itself.

Having captured 604 first light intensity data at a sampling rate less than the Nyquist sampling rate for the LCOM message signal, the method 600 next determines 608 a capture offset. As described above, the capture offset is used to by the method 600 to sample different portions of an LCOM signal over the course of at least two repetitions of the signal, thereby overcoming the conventional inadequacy of under sampling a signal. The method for determining 608 the capture offset will be described in more detail in the context of FIG. 6B. However, at a high level, the capture offset is based on a measurement or identification of (1) a frequency of repetition of the LCOM signal being sampled and (2) a measurement or identification of the waveform or duration of a single repetition of the LCOM signal being sampled. Furthermore, the capture offset value can be any value that is not an integer multiple of a ratio "R." The ratio R, referred to herein as a "capture offset" value is a ratio of the sampling period (the reciprocal of the sampling frequency) divided by the signal period (the reciprocal of one repetition of the LCOM signal frequency). The capture offset R is shown below as Equation 1.

$$R = \text{Sampling Period}/LCOM\text{ Signal Period} \quad \text{Equation 1}$$

Second light intensity data is captured 612. These data are captured at locations within the LCOM signal that are selected based on, at least, (1) the start location of the signal and (2) the capture offset. Using this algorithm ensures that the second light intensity data includes data from different locations of the LCOM signal waveform than captured in the first light intensity data. The data are then merged 616 as a precursor to determining whether sufficient data has been collected to reconstruct the entire signal. This will be illustrated in more detail in FIGS. 7A to 9B.

In another embodiment, a sampling frequency is determined to ensure sufficient data are captured to accurately reconstruct the LCOM signal. To minimize the number of data captured and minimize the capture time, while still capturing sufficient data to completely sample and reconstruct a waveform of the LCOM signal, data is captured throughout the entire waveform of the signal at equidistant locations separated by one unit of the smallest data entity in the signal (e.g., a bit or byte). This is expressed in one embodiment in Equation 2, below.

$$f_s = k/T_M(1-1/N_T) \quad \text{Equation 2}$$

in which k is a constant based on an upper limit of a maximum sampling frequency of the image capture device, $T_M$ is a period of each signal (i.e. one repetition of the waveform), and $N_T$ is a total number data points to sample the entire waveform. In one embodiment, $N_T$ is a number of data points sampled to fill a buffer, as described below.

Regardless of the sampling method used, if it is determined 620 that the data of the first and the second light intensity data, collected over at least two repetitions of the LCOM signal, provide sufficient data to meet the reconstruct the signal (or meet the Nyquist sampling frequency), then the light-based communication signal is reconstructed 628. Upon reconstruction, the signal is decoded by the mobile computing device according to a protocol selected by the mobile computing device or as instructed by meta-data transmitted with the LCOM signal. If it is determined 628 that there is not sufficient data to reconstruct the LCOM signal, then additional data is optionally captured 624. The adequacy of the data is re-determined 620 and additionally data captured 624 until the Nyquist sampling frequency is met by the captured data.

The order of the elements of method 600 described above is not required for implementation of all embodiments of the present disclosure. For example, in some embodiments the capture offset is determined 608 first by identifying light based communication signal frequency using periods of inactivity, zero intensity, or intensities designated as separations between LCOM signal repetitions. Analogously, the LCOM signal itself can provide signal frequency in a meta-data portion of a transmitted signal that is decoded by the mobile computing device and then applied by the mobile computing device to determine 608 the capture offset. Other variations of the described order will be appreciated.

FIG. 6B is a method flow diagram illustrating a method 640 for determining 608 a data capture offset as applied in the method 600, in an embodiment. As indicated above, a period is determined 644 for one repetition of the light based communication signal. A sampling period of the light receiver of the mobile computing device is identified 648. A ratio R is determined 652 according to Equation 1. For values of R that are an integer, the sampling of the light based communication signal will be limited to the same locations within a repeated waveform regardless of the number of repetitions that are sampled. Therefore, if R is determined 656 to be an integer, then the sampling period of the light receiver is adjusted 660 by a processor of the mobile computing device. Once R is determined 656 to be a non-integer value, samples of light intensity data are collected 664.

Regardless of the sampling period R, a complication that may arise is that the LCOM enabled luminaire and the image capture device typically each operate using independent, unsynchronized clocks. This complicates reconstruction of a sampled waveform by a mobile computing device (or a device in communication with a mobile computing device) because the mobile computing device does not reconstruct the captured data with a periodicity matching that of the transmitted signal. This is particularly problematic for captured signal data stored in a buffer.

In some embodiments the clocks of the mobile computing device and the LCOM enabled luminaire are synchronized using a phase locked loop (PLL) circuit. In other embodiments, a PLL is not sufficiently precise or accurate to accomplish this synchronization. To remedy this synchronization problem when storing captured data in a buffer, a mobile computing device can use a known baud rate (i.e., the number of bits in a signal) of the LCOM enabled luminaire signal. The mobile computing device then determines the maximum deviation between the sampling frequency and the signal transmission frequency. The mobile computing device configures a plurality of trial buffers, each of which is a different length. The longest buffer is the signal length (determined based on baud rate) plus the maximum deviation. The maximum deviation is a known system parameter based on an accuracy transmission by the LCOM enabled luminaire and an accuracy of reception by mobile computing system. Each buffer is configured in increments smaller than the maximum according to Equation 3.

$$f_s/(2 * \text{baud rate} * N_T) \quad \text{Equation 3}$$

For each trial buffer, the mobile computing device computes a trial buffer score that measures the integrity of the stored signal. For example the score would determine how close the frequency of a signal stored in a trial buffer is to an expected signal frequency based on the transmitter baud rate. In some examples this is accomplished by using a fast Fourier transform to identify a signal frequency of the stored signal, which is then compared to the expected signal frequency. The trial buffer having a score indicating the closest alignment between the stored signal frequency and the expected signal frequency (e.g., a score closest to one for examples in which score is a ratio between the expected frequency and the stored signal frequency) is identified and the stored signal in that trial buffer is used for decoding.

Rolling Shutter and Global Shutter Image Capture Schemes

The above method 600 is now described in the context of various embodiments using different light receivers commonly found on a mobile computing device. However, prior to describing these applications, two different type of shutter schemes found in cameras of mobile computing devices is presented to facilitate explanation of embodiments of the present disclosure.

Figure 5:
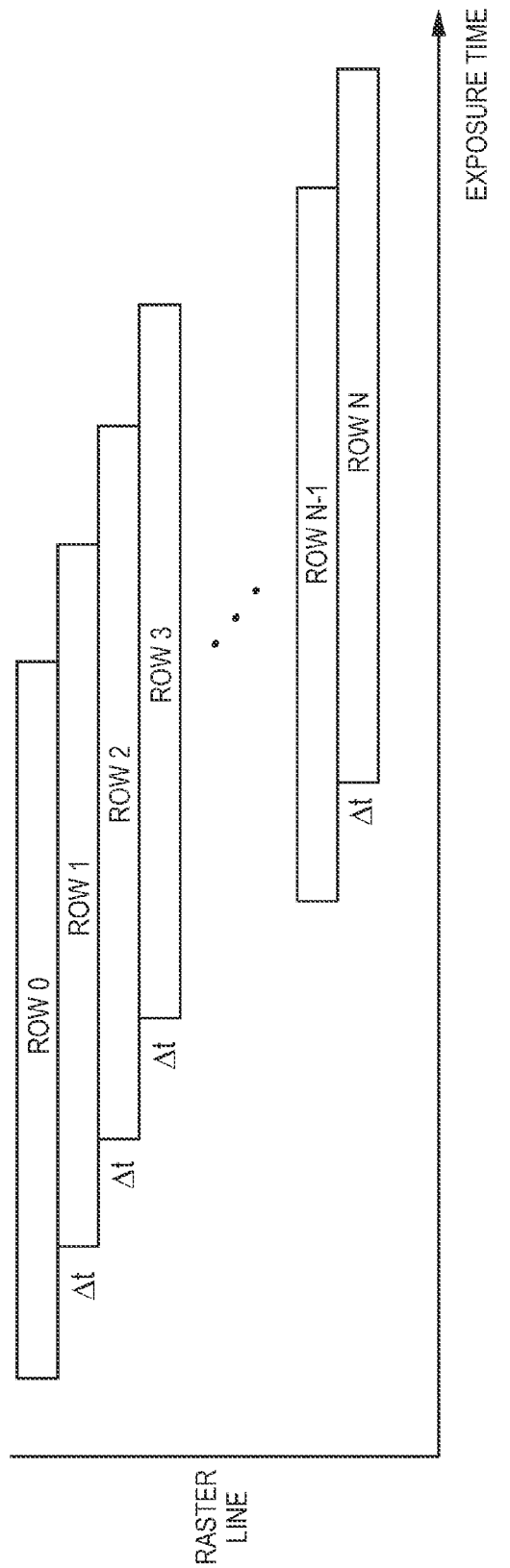
FIG. 5 schematically illustrates a rolling shutter capture scheme of the prior art, in an embodiment.

Capturing an LCOM signal using an image capture device typically uses a "rolling shutter" methodology. This rolling shutter method is schematically illustrated in FIG. 5. As shown, each row of sensor pixels (known as a "raster line") in a sensor of an image capture device (e.g., a still-image camera of a mobile computing device) records light intensity data from a light source. The light intensity data recorded within each raster line corresponds to a same moment in time but different spatial locations of the light source. For illustration purposes only, assuming a luminaire corresponds exactly to a field of view of an image sensor, one raster line corresponds to a line of light intensity from one edge of the luminaire to an opposing edge of the luminaire at the instant the sensor pixels of that raster line captured the light intensity data. Most LCOM decoding schemes average the light intensity values for each sensor pixel in a raster line to a single value. This single value is then used in the decoding of the signal.

However, one deficiency of the rolling shutter scheme is that it reduces the number of independent data points captured from the LCOM enabled luminaire. As shown in FIG. 5, each raster line of the image sensor begins its image capture after a slight time delay Δt relative to the preceding adjacent raster line. Because the time delay Δt is less than the length of time for a raster line to complete its image data capture, many of the raster lines capture at least some of the light intensity data from the LCOM enabled luminaire at the same time. As a result, each of these "overlapping" raster lines includes at least some of the same light intensity data. This has the effect of reducing the sampling rate of rolling shutter image capture devices. For example, if 100 raster lines overlap at any given time, the number of unique samples of light intensity data captured during a frame is the number of total raster lines in the frame divided by 100. That is, a typical camera in a mobile computing device with 720 raster lines per frame only receives 7.2 unique samples per frame because 100 raster lines overlap and therefore include some of the same light intensity data.

Reducing the number of samples by using a rolling shutter scheme is problematic for at least the reason that it reduces the number of samples captured by an image capture device far below the Nyquist rate needed for accurate signal decoding. For example, the Nyquist rate of a typical 32 bit LCOM message signal would preferably have 64 samples captured for accurate decoding. For this reason, using a rolling shutter capture scheme that, given current image capture device configurations, captures on the order of 10 unique samples complicates the receipt and accurate decoding of an LCOM signal.

Global shutter image capture schemes capture image data for all sensor pixels of the entire image capture devise sensor at the same time, rather than raster line by raster line as in the rolling shutter scheme. Thus, using a global shutter image captures one unique sample of light intensity data per captured frame. Conventional image capture devices of mobile computing devices generally are not equipped for global shutter image capture schemes. However, some embodiments of the present disclosure include video cameras of mobile computing devices adapted to act as a global shutter image capture device. Those image capture devices configured for global shutter image capture are typically too slow to capture an entire LCOM signal, having sample rates of about 15 frames, and therefore unique samples, per second. As in the rolling shutter example, this sampling rate is still far below the preferred Nyquist sampling rate.

Global Shutter Sampling Using Mobile Device Video Camera

Figure 7A:
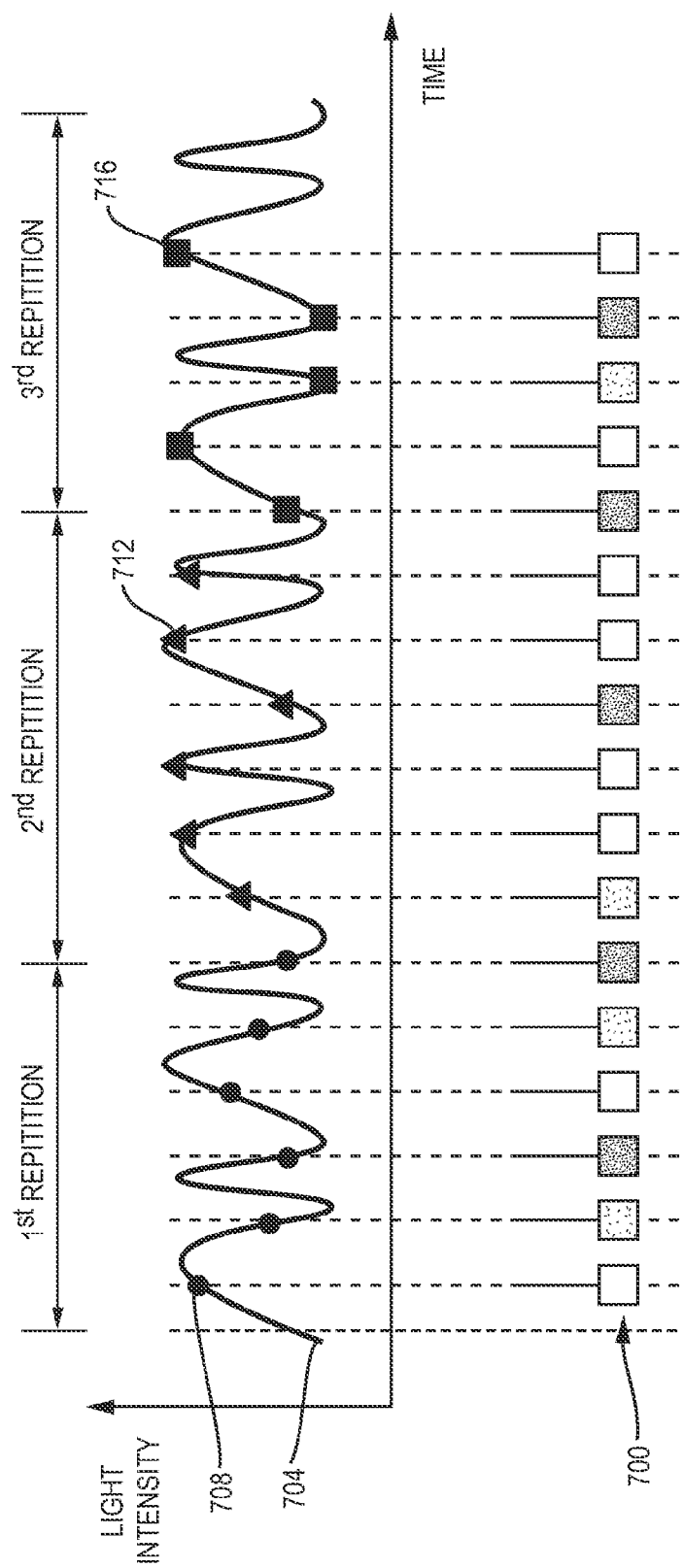
FIG. 7A schematically illustrates global shutter image data captured over multiple repetitions of an LCOM signal used to reconstruct an LCOM waveform, in an embodiment.
Figure 7B:
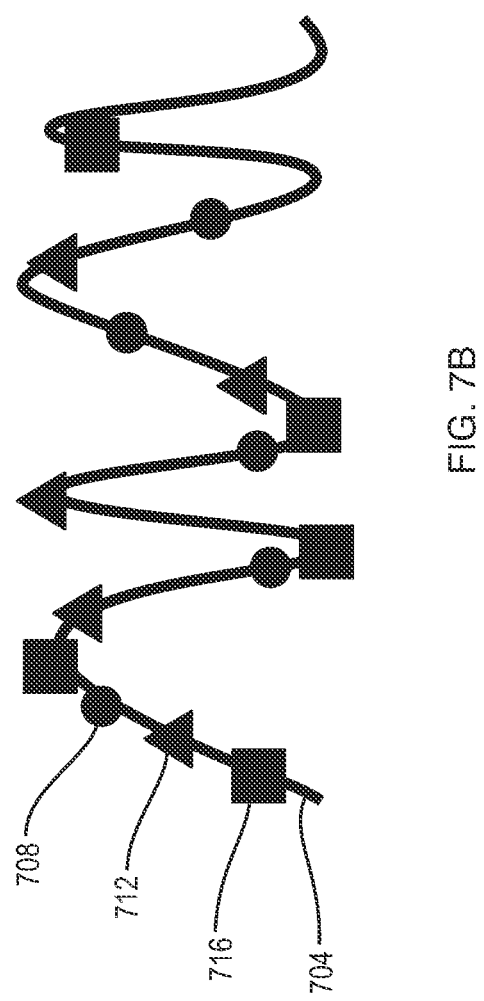
FIG. 7B schematically illustrates a reconstructed LCOM waveform using global shutter image data, in an embodiment.

FIGS. 7A and 7B schematically illustrate an embodiment in which the methods 600 and 640 are performed by a video camera associated with a mobile computing device. In this embodiment, the video camera is configured to capture global shutter data at a frequency less than that of the LCOM message signal frequency, as described above. FIG. 7A includes schematic representations of light intensity images 700 captured using the global shutter over three repetitions of the LCOM signal. The light intensity data 708, 712, 716 correspond to each global shutter light intensity image 704 shown. FIG. 7A also shows the LCOM signal waveform 704 reconstructed using the data 708, 712, and 716.

In FIG. 7A, light intensity images 700 are schematically shown with shading suggestive of the light intensity captured at each location. As described above, the light intensity data of each sensor pixel in these images is averaged across the entire captured frame to produce a corresponding light intensity data point. As described above, embodiments identify the start and stop of each repetition of the LCOM message signal. Using this information, each of the collected data points is associated with a location within a repetition of the LCOM message signal. For example, circular data points 708 are associated with light intensity data captured during a first repetition of the LCOM message signal, triangular data points 712 are associated with light intensity data captured during a second repetition of the LCOM message signal, and square data points 716 are associated with light intensity data captured during a third repetition of the LCOM message signal. The locations of these data within each signal repetition waveform are identified by identifying the start and stop of each repetition of the LCOM message signal (either through direct measurement or through analysis of LCOM signal metadata as described above) and the duration of each repetition. With this information, each data point is located at a correct time within each repetition of the LCOM message signal. This effectively allows the mobile computing device to sample the entire waveform 704 over multiple repetitions of the LCOM signal, thereby enabling the reconstruction of the entire signal waveform even when using sampling rates below the Nyquist rate.

FIG. 7B schematically illustrates a reconstructed waveform 704 according to some embodiments of the present disclosure. As mentioned above, the location within a signal is identified and associated with each data point collected relative to start and stop of each LCOM signal repetition. The complete LCOM signal is reconstructed by merging all data points collected from each LCOM signal repetition while maintaining the proper relative location of each data point with respect to the other data points. This is schematically represented by FIG. 7B which shows the proper relative location of points from the each of the first, second, and third repetitions 708, 712, 716 respectively. This allows the LCOM signal waveform 704 to be reconstructed. The waveform 704 may optionally be completed by interpolating data between points. The LCOM message itself is interpreted from the reconstructed waveform 704 using, in this example, a Manchester encoding scheme to convert the waveform 704 to bits. The interpreted LCOM message is then presented to the user via the mobile computing device.

Sampling Using Mobile Device Light Sensor

Figure 8A:
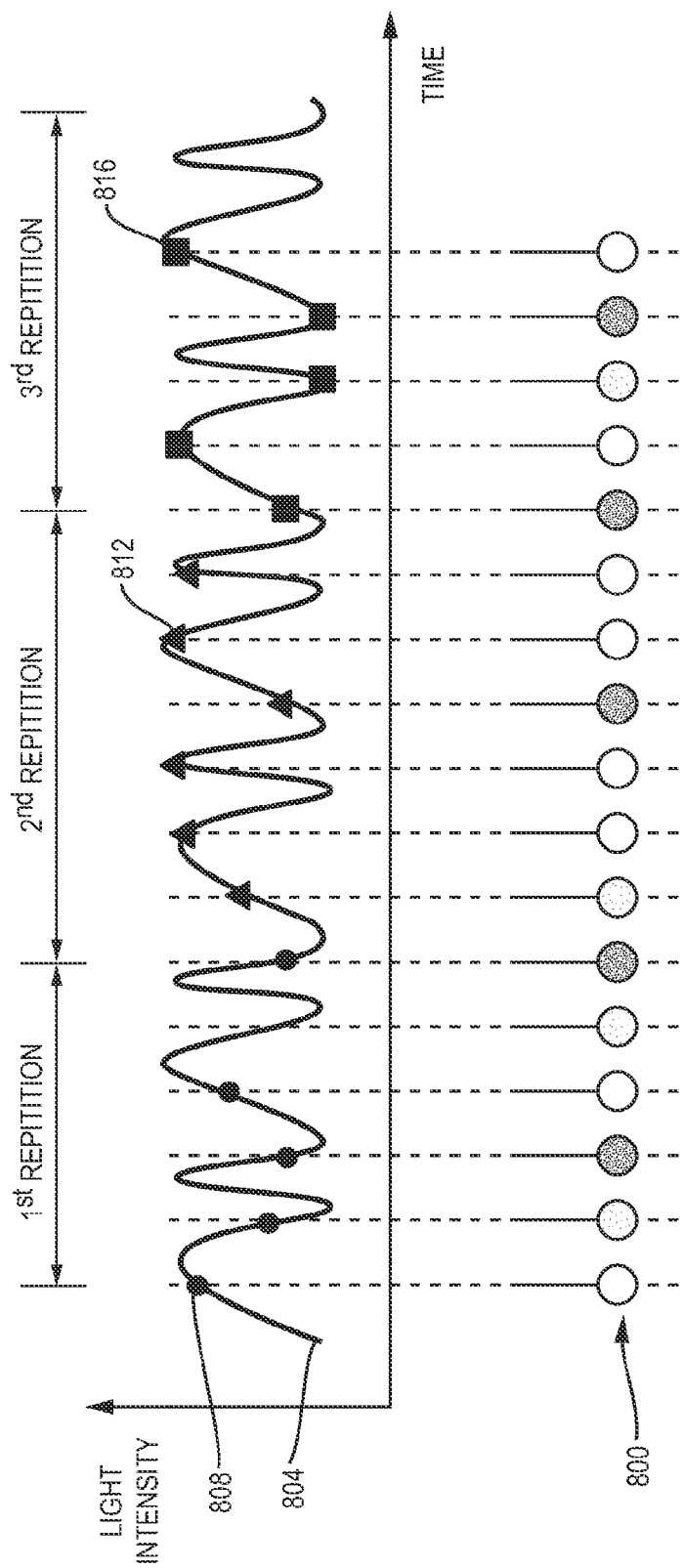
FIG. 8A schematically illustrates light sensor data captured over multiple repetitions of an LCOM signal used to reconstruct an LCOM waveform, in an embodiment.

FIGS. 8A and 8B present schematic illustrations analogous to those explained above in the context of FIGS. 7A and 7B except that the light intensity data is collected using a light sensor (which in some embodiments includes a CMOS light sensor) of a mobile computing device rather than a video camera sensor functioning as a global shutter. In some examples, a light sensor acts as a camera having a single sensor pixel.

FIG. 8A includes schematic representations of light intensity data captured 800 a light sensor over three repetitions of the LCOM signal, the light intensity data 808, 812, 816 corresponding to captured light intensity data during a first, second and third repetition of the LCOM message, respectively. FIG. 8A also shows the LCOM signal waveform 804 reconstructed using the data 808, 812, and 816.

In FIG. 8A, light intensity data 800 captured from an LCOM enabled luminaire are schematically shown with shading suggestive of the light intensity captured at each location. As described above, circular data points 808 are associated with light intensity data captured during a first repetition of the LCOM message signal, triangular data points 812 are associated with light intensity data captured during a second repetition of the LCOM message signal, and square data points 816 are associated with light intensity data captured during a third repetition of the LCOM message signal. These data and their respective locations on a repeated signal waveform are used to reconstruct the waveform 804 as shown in FIG. 8B using embodiments described herein.

Rolling Shutter Sampling Using Mobile Device Still-Image Camera

Figure 9A:
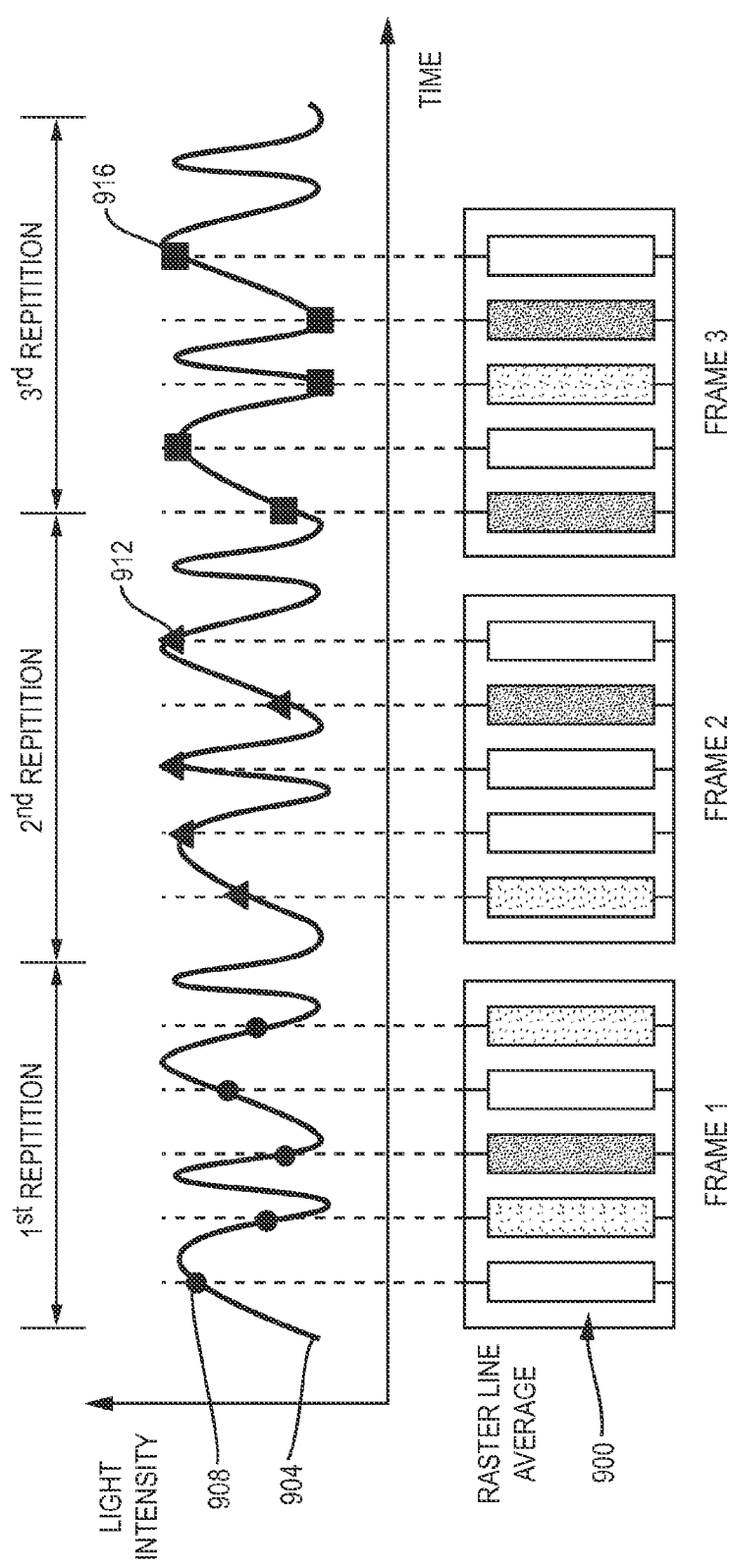
FIG. 9B schematically illustrates a reconstructed LCOM waveform using rolling shutter image data, in an embodiment.
Figure 9B:
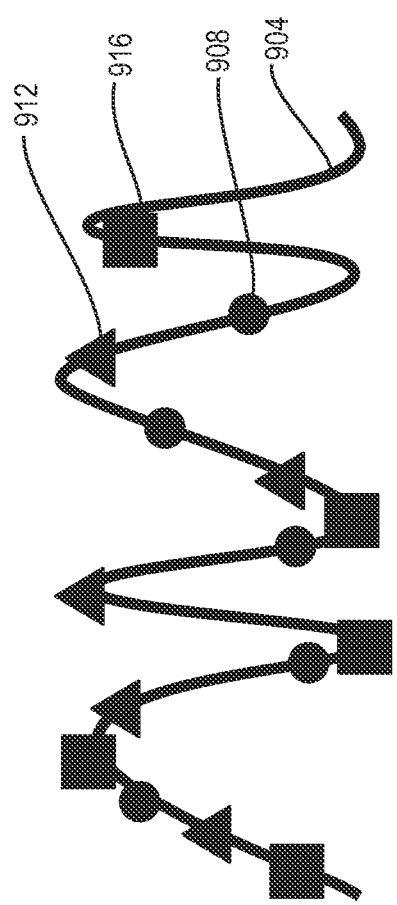

FIGS. 9A and 9B present schematic illustrations analogous to those explained above in the context of FIGS. 7A and 7B except that the light intensity data is collected using a rolling shutter camera of a mobile computing device rather than a video camera sensor functioning as a global shutter. The light data is collected per raster line 900 or alternatively, per unique raster line 900 that does not overlap in time with any other raster lines.

FIG. 9A includes schematic representations of light intensity data captured 900 by a rolling shutter camera over three repetitions of the LCOM signal, the light intensity data 908, 912, 916 corresponding to captured light intensity data during a first, second and third repetition of the LCOM message, respectively. FIG. 9A also shows the LCOM signal waveform 904 reconstructed using the data 908, 912, and 916.

In FIG. 9A, light intensity data 900 captured from an LCOM enabled luminaire are schematically shown with shading suggestive of the light intensity captured at each location. As described above, circular data points 908 are associated with light intensity data captured during a first repetition of the LCOM message signal, triangular data points 912 are associated with light intensity data captured during a second repetition of the LCOM message signal, and square data points 916 are associated with light intensity data captured during a third repetition of the LCOM message signal. These data and their respective locations on a repeated signal waveform are used to reconstruct the waveform 904 as shown in FIG. 9B using embodiments described herein.

Examples

One example of the present disclosure includes a method for sampling a light-based communication signal that is repeated a plurality of times. The method includes capturing first light intensity data of the light-based communication signal. The capturing is performed at a sampling rate less than a Nyquist sampling rate for the light-based communication signal, and the capturing of the first light intensity data initiated at a first location of a first repetition of the light-based communication signal. The first location is between a start location and an end location of the first repetition of the light-based communication signal. A capture offset that is a non-integer multiple of a sampling period divided by a signal period of the light based communication signal is determined. The method captures second light intensity data of the light-based communication signal at the sampling rate. The capturing of the second light intensity data is initiated at the first location plus the capture offset. In one embodiment of this example, the capturing includes capturing at least one additional light intensity data of the light-based communication signal, each of the at least one additional light intensity data initiated at the first location plus a non-integer multiple of the capture offset, each of the at least one additional sets of light intensity data captured at a different non-integer multiple of the capture offset. In one embodiment of this example, the method further includes reconstructing the light-based communication signal by merging the first and the second light intensity data as a function of time between the start time and end time of the repetition of the signal. In one embodiment of this example, the capturing is performing using an image capture device of a mobile computing device configured to include at least one of a global shutter and a rolling shutter. In one embodiment of this example, the capturing is performed using a light sensor of a mobile computing device. In one embodiment of this example, the capturing is performed using a still-image camera of a mobile computing device. In one embodiment of this example, the method includes synchronizing the capturing sampling rate to a transmission frequency of the light-based communication signal, the synchronizing storing each of a plurality of captured signals in each of a plurality of trial buffers. This synchronizing also includes configuring a first trial buffer of the plurality with a maximum buffer size based on a signal length plus a maximum deviation and configuring each remaining buffer of the plurality of trial buffers to have a buffer size reduced by a different multiple of a function inversely proportional to a produce of baud rate and a number of captured data to sample the signal. A score is determined for each buffer of the plurality, the score indicating a degree of synchronization between the signal length and the buffer length. In one embodiment of this example, determining the capture offset further includes adjusting a sampling period to cause the sampling period divided by the signal period of the light based communication signal to be a non-integer multiple. The above example method may also be instantiated in a computer program product wherein the computer program product is stored on one or more non-transitory computer-readable mediums that include instructions that, when executed by one or more processors, cause the method to be carried out. The non-transitory computer readable medium(s) may include, for example, one or more machine readable mediums, such as a hard disk, ROM, solid state drive, thumb drive, embedded controller memory, compact disc, server computer, or other such non-transitory mediums that can be accessed by one or more processors so that the instructions thereon can be executed to carry out the process. Note that the process so encoded on the computer readable medium(s) need not be carried out, and may remain unexecuted in some such embodiments.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

What is claimed is:

1. A method for sampling a light-based communication signal, the light-based communication signal repeated a plurality of times, the method for sampling comprising:
    capturing first light intensity data of the light-based communication signal, the capturing performed at a sampling rate less than a Nyquist sampling rate for the light-based communication signal, the capturing of the first light intensity data initiated at a first location of a first repetition of the light-based communication signal, the first location between a start location and an end location of the first repetition of the light-based communication signal;
    determining a capture offset that is a non-integer multiple of a sampling period divided by a signal period of the light based communication signal; and
    capturing second light intensity data of the light-based communication signal at the sampling rate, the capturing of the second light intensity data initiated at the first location plus the capture offset.

2. The method of claim 1, further comprising:
    capturing at least one additional light intensity data of the light-based communication signal, each of the at least one additional light intensity data initiated at the first location plus a non-integer multiple of the capture offset, each of the at least one additional sets of light intensity data captured at a different non-integer multiple of the capture offset.

3. The method of claim 1, further comprising reconstructing the light-based communication signal by merging the first and the second light intensity data as a function of time between the start time and end time of the repetition of the signal.

4. The method of claim 1, wherein the capturing is performed using an image capture device of a mobile computing device configured to include at least one of a global shutter and a rolling shutter.

5. The method of claim 1, wherein the capturing is performed using a light sensor of a mobile computing device.

6. The method of claim 1, wherein the capturing is performed using a camera of a mobile computing device.

7. The method of claim 1, further comprising synchronizing the capturing sampling rate to a transmission frequency of the light-based communication signal, the synchronizing storing each of a plurality of captured signals in each of a plurality of trial buffers.

8. The method of claim 7, wherein the synchronizing further comprises:
  configuring a first trial buffer of the plurality with a maximum buffer size based on a signal length plus a maximum deviation;
  configuring each remaining buffer of the plurality of trial buffers to have a buffer size reduced by a different multiple of a function inversely proportional to a product of baud rate and a number of captured data to sample the signal; and
  determining a score for each buffer of the plurality, the score indicating a degree of synchronization between the signal length and the buffer length.

9. The method of claim 1, wherein determining the capture offset further comprising adjusting a sampling period to cause the sampling period divided by the signal period of the light based communication signal to be a non-integer multiple.

10. A computer program product for sampling a light-based communication signal, wherein the light-based communication signal is repeated a plurality of times, the computer program product comprising at least one non-transitory computer-readable storage medium containing computer program code that, when executed by one or more processors, causes a method to be performed, the method comprising:
  capturing first light intensity data of the light-based communication signal, the capturing performed at a sampling rate less than a Nyquist sampling rate for the light-based communication signal, the capturing of the first light intensity data initiated at a first location of a first repetition of the light-based communication signal, the first location between a start location and an end location of the first repetition of the light-based communication signal;
  determining a capture offset that is a non-integer multiple of a sampling period divided by a signal period of the light based communication signal; and
  capturing second light intensity data of the light-based communication signal at the sampling rate, the capturing of the second light intensity data initiated at the first location plus the capture offset.

11. The computer program product of claim 10, further comprising:
  capturing at least one additional light intensity data of the light-based communication signal, each of the at least one additional light intensity data initiated at the first location plus a non-integer multiple of the capture offset, each of the at least one additional sets of light intensity data captured at a different non-integer multiple of the capture offset.

12. The computer program product of claim 10, further comprising reconstructing the light-based communication signal by merging the first and the second light intensity data as a function of time between the start time and end time of the repetition of the signal.

13. The computer program product of claim 10, wherein the capturing is performed using a camera of a mobile computing device, the camera configured as a global shutter.

14. The computer program product of claim 10, wherein the capturing is performed using a light sensor of a mobile computing device.

15. The computer program product of claim 10, wherein the capturing is performed using a camera of a mobile computing device.

16. The computer program product of claim 10, further comprising synchronizing the capturing sampling rate to a transmission frequency of the light-based communication signal, the synchronizing storing each of a plurality of captured signals in each of a plurality of trial buffers.

17. The computer program product of claim 16, wherein the synchronizing further comprises:
  configuring a first trial buffer of the plurality with a maximum buffer size based on a signal length plus a maximum deviation;
  configuring each remaining buffer of the plurality of trial buffers to have a buffer size reduced by a different multiple of a function inversely proportional to a product of baud rate and a number of captured data to sample the signal; and
  determining a score for each buffer of the plurality, the score indicating a degree of synchronization between the signal length and the buffer length.

18. The computer program product of claim 10, wherein determining the capture offset further comprising adjusting a sampling period to cause the sampling period divided by the signal period of the light based communication signal to be a non-integer multiple.

* * * * *